United States Patent [19]

Mizuta et al.

[11] Patent Number: 5,417,318

[45] Date of Patent: May 23, 1995

[54] METHOD AND DEVICE FOR MOVING AND POSITIONING A CENTER CORE

[75] Inventors: Akira Mizuta; Takeaki Shibuya, both of Kanagawa, Japan

[73] Assignee: Fuji Photo Film Co., Ltd., Japan

[21] Appl. No.: 225,459

[22] Filed: Apr. 6, 1994

[30] Foreign Application Priority Data

Apr. 6, 1993 [JP] Japan .................. 5-101802

[51] Int. Cl.⁶ ............................................. B65G 47/24
[52] U.S. Cl. ................................. 198/383; 198/416; 198/468.11
[58] Field of Search ............... 198/378, 383, 388, 389, 198/390, 416, 468.9, 468.11

[56] References Cited

U.S. PATENT DOCUMENTS

| | | | |
|---|---|---|---|
| 3,014,576 | 12/1961 | Pellow et al. | 198/468.11 X |
| 3,506,107 | 4/1970 | Tarzian | 198/383 X |
| 4,705,158 | 11/1987 | Sirvet | 198/468.11 X |
| 4,776,447 | 10/1988 | Pitcher | 198/416 X |
| 4,789,294 | 12/1988 | Sato et al. | 414/416 |

FOREIGN PATENT DOCUMENTS

| | | | |
|---|---|---|---|
| 0031530 | 3/1980 | Japan | 198/378 |
| 0161211 | 12/1981 | Japan | 198/388 |
| 2187696 | 9/1987 | United Kingdom | 198/468.4 |

Primary Examiner—James R. Bidwell
Attorney, Agent, or Firm—Sughrue, Mion, Zinn, Macpeak & Seas

[57] ABSTRACT

The method and device are used to move a center core 2 from a given delivery passage to a given position and position the same at the given position, the center core 2 including in the outer periphery thereof a flange portion 12 for bonding a magnetic disk sheet thereto, a circular recess portion 15 disposed on one side of the center core 2 and inside the flange portion 12 with a stepped portion 11 between them, and a center hole 13 formed in the central portion of center core 2. In the method and device, there is provided a delivery passage A for delivering and lining up the center cores sequentially, there is also provided guide portion contactable with the stepped portion 11 to guide the center core 2 along the delivery passage A, a center pin 9 is inserted into the central hole 13 of the center core 2 stopped by stopping stopper 5 for stopping the center core 2, and the center core 2 is moved by the center pin 9 to fit the circular recess portion 15 of the center core 2 with a projected portion 6 provided in a given position, whereby the center core 2 can be moved and positioned accurately.

4 Claims, 2 Drawing Sheets

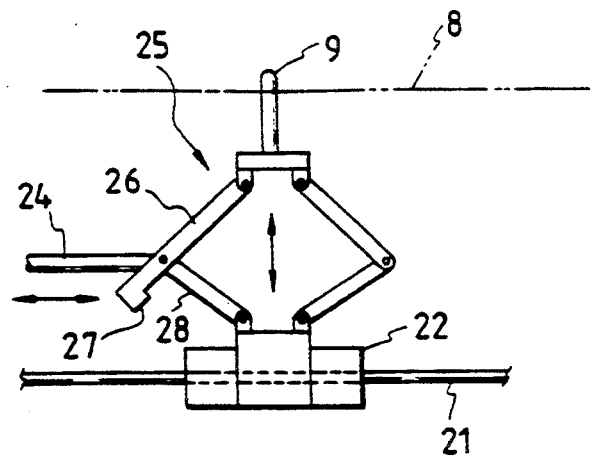
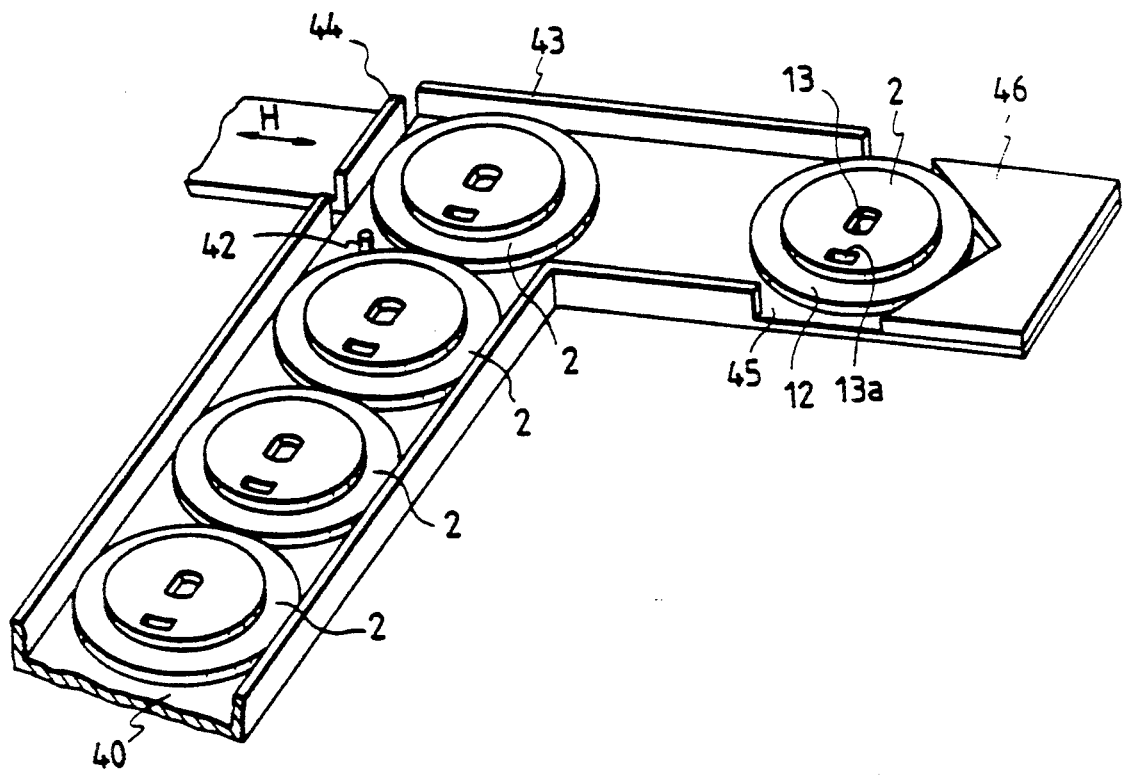
PRIOR ART

METHOD AND DEVICE FOR MOVING AND POSITIONING A CENTER CORE

BACKGROUND OF THE INVENTION

1. Field of the Invention

The present invention relates to a method and device for moving and positioning a center core for a magnetic disk which is disposed in the central portion of a magnetic disk sheet to be rotatable stored in a magnetic disk cartridge, when the magnetic disk cartridge is manufactured.

2. Related Art

Conventionally, a magnetic disk cartridge is used in various fields as a magnet recording medium. The magnetic disk cartridge, as known well, includes upper and lower half shells and a magnetic disk sheet such that the magnetic disk sheet is rotatably stored in a hollow space formed by the upper and lower half shells. And, in the center portion of the magnetic disk sheet, there is disposed a metal center core which includes a central hole and an engaging hole formed adjacent to the central hole and also includes in the outer peripheral portion thereof a flange portion for bonding the disk sheet thereto. When the magnetic disk cartridge is loaded into a recording and reproducing device, the center core is properly engageable with rotational drive means provided in the device to thereby be able to rotate the disk sheet at high speeds. Therefore, in a process of manufacturing a magnetic disk cartridge, there is included a step of bonding the above-mentioned center core and magnetic disk sheet to each other, and the bonding step is generally automated.

And, conventionally, when bonding the magnetic disk sheet to the center core, the center cores successively delivered from a part supply device are previously arranged in line on a delivery passage and are then taken out one by one from the lead one of the center cores, and then there is performed an operation to move and position only the subject center core, which operation is carried out to prepare the next step of bonding the magnetic disk sheet to the center core. There is conventionally employed such a method as shown in FIG. 5.

According to the method shown in FIG. 5, a plurality of center cores 2 each having a central hole 13 and an engaging hole 13a are arranged in line on a delivery passage 40 provided in a part supply device, and the center cores 2 excluding the lead center core to be pushed out by a pusher 44 and the next center core are stopped by a stopper pin 42 which is disposed on the delivery passage such that it can be projected as occasion arises. And, only one of the center cores is stopped from moving on and along the delivery passage 40 by a member, for example, a barrier 43 disposed on the far side of the delivery passage 40. At a given position in such stop area, there is disposed the above-mentioned pusher 44 which is used to move the subject center core in a direction intersecting horizontally (almost at an angle of 90°) relative to the delivery direction of the delivery passage 40. The pusher 44 can be moved in an intersecting direction (a direction of an arrow H shown in FIG. 5) with respect to the delivery passage 40 by drive means such as a cylinder device or the like, and the center core 2 can be fed out to the side of a moving and positioning base member 45 by means of the operation of the pusher 44.

The moving and positioning base member 45 includes in the leading portion (on the far side) thereof a positioning stopper 46 which is formed in a V-like shape and is used to receive and position the center core 2 fed out by the pusher 44. That is, according to the conventional method and device, after the center core 2 is fed out by the pusher 44, the center core 2 is moved while the outer peripheral edges of the flange portion 12 of the center core 2 are abutted against the V-shaped portion of the positioning stopper 46 and thus the position thereof is restricted in this manner. And, when the center core 2 is moved to the position of the positioning stopper 46, then the center core 2 is attracted from above by an attracting device provided in a robot arm (which is provided separately but is not shown) and is then delivered to a given position in which a magnetic disk sheet is bonded to the center core.

In the above-mentioned conventional moving method and device, to position the center core on the moving and positioning base member, the outer peripheral edges of the flange portion of the center core are abutted against the positioning stopper. However, the shape of the center core is not limited to one shape but a plurality of shapes are actually employed, which provides a problem in the conventional method and device.

In other words, if the shapes of the center cores are different, then the outside diameters of the flange portions of the center cores are different from one another. This results in the fact that the central positions of the center cores are shifted. For this reason, when the center cores having different outside diameters are manufactured in the same production line, the mounting position of the positioning stopper must be changed in order to prevent shifting of the position of catching the center core by the attaching device or the like. Due to this, the positioning stopper must be replaced or must be adjusted in position according to the outside diameters of the flange portions, or the stroke of the pusher must be adjusted. This requires a considerable switching time, which results in lowered productivity.

SUMMARY OF THE INVENTION

The present invention aims at eliminating the drawbacks found in the above-mentioned conventional center core moving and positioning method and device. Accordingly, it is an object of the invention to provide method and device for moving and positioning a center core for a magnetic disk, which, even when the center cores having different outside diameters are manufactured in the same production line, does not require such switching time due to the different outside diameters of the center cores, but is able to move and position each of the center cores very efficiently.

In attaining the above object, according to the invention, there is provided a center core moving and positioning method for feeding out one by one a plurality of center cores, each center core including in the outer periphery thereof a flange portion for bonding a magnetic disk sheet thereto, a circular projection portion disposed one side thereof and inside the flange portion with a stepped portion between them and a central hole formed in the circular projection portion for engagement of a drive shaft, from a delivery passage for sequentially delivering and lining up the center cores, and positioning the center core at a given position, the method comprising the steps of: after the center core is stopped in the terminal end portion of the delivery passage, moving the center core on and along a moving and positioning base member by means of fitting means engageable with the central hole of the center core; and, fitting the circular recess portion of the center core with a projected portion provided on the moving and positioning base member, thereby positioning the center core.

Also, in attaining the above object, according to the invention, there is provided a center core moving and positioning device which comprises a delivery passage for sequentially delivering and lining up a plurality of center cores, each center core including in the outer periphery thereof a flange portion for bonding a magnetic disk sheet thereto, a circular projection portion disposed one side thereof and inside the flange portion with a stepped portion therebetween and a central hole formed in the circular projection portion for engagement of a drive shaft, and moves the center cores one by one onto positioning means, the device comprising: stopping means disposed in the terminal end portion of the delivery passage and contactable with the stepped portion of the center core to stop the center core; and, positioning means including a moving and positioning base member extending transversely to the delivery passage in correspondence to the stop position of the center core stopped by the stopping means, a center pin fittable into the center core central hole so as to move the center core on the moving and positioning base member, and a projected portion fittable with a circular recess portion disposed inside the stepped portion of the center core moved by the center pin. Alternatively, the moving and positioning base member can also be structured such that it includes a guide groove for allowing the movement of the center pin which is fitted into the center core from the bottom side thereof, or that in the peripheral portions of the above projected portion there are formed a plurality of suction holes for attracting the flange portion of the center core.

BRIEF DESCRIPTION OF THE DRAWINGS

FIG. 4 is a schematic side view of the main portions of another embodiment of a device for moving and positioning a center core for a magnetic disk according to the invention; and, FIG. 5 is a perspective view of a conventional device for moving and positioning a center core.

DESCRIPTION OF THE PREFERRED EMBODIMENTS

Description will be given hereinbelow of an embodiment of a center core moving and positioning device according to the invention with reference to FIGS. 1 to 4.

Figure 1:
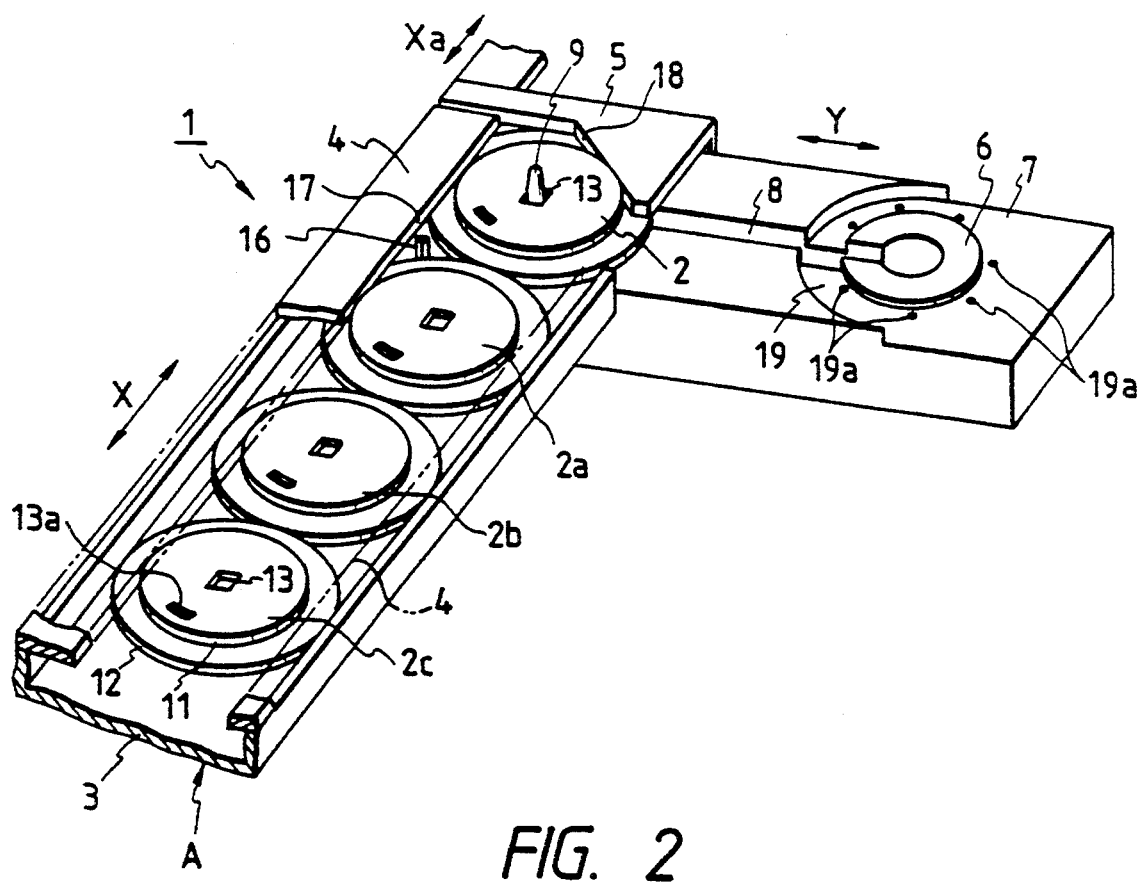
FIG. 1 is a perspective view of the main portions of an embodiment of a device for moving and positioning a center core for a magnetic disk according to the invention.

A center core moving and positioning device 1 shown in FIG. 1 includes a shooter 3 serving as a delivery passage A for delivering a plurality of center cores 2, 2a, 2b, . . . , a guide portion 4 disposed on the upper edge portion of the shooter 3 and extending over the top portion of the flange portion 12 of the center core for guiding the movement of the center core, and a stopper 5 arranged such that it is movable back and forth (that is, in a direction of an arrow Xa shown in FIG. 1) and serving as stop means which can be projected out horizontally to the guide portion 4 and is contactable with a stepped portion 11 provided in the center core 2 to thereby stop the center core 2 at a given position. Also, the moving and positioning device 1 further includes a moving and positioning base member 7 projected out perpendicularly to the guide portion 4 and including in the leading end portion thereof a projected portion 6 forming positioning means, a guide groove 8 formed extending centrally along the longitudinal direction of the moving base member 7 for connecting the center of the center core to be stopped by the stopper 5 with the center of the projected portion 6, and a guide pin 9 serving as moving means which is movable within the guide groove 8 in such a manner that it is free to appear from and disappear into the bottom of the moving and positioning base member 7.

Referring briefly to the operation of the above moving device 1, the center cores, which are successively delivered in line on the delivery passage A, are fed out from the delivery passage A one by one. In other words, at first, the stepped portion 11 of the center core 2 is held by the guide portion 4 and stopper 5 so that it is stopped on the delivery passage. Afterwards, the center pin 9 is engaged with the central hole 13 from below, the center core 2 is moved together with the center pin 9 in the direction of the projected portion 6, and the circular recess portion 15 (see FIG. 2) is fitted with or mounted to the projected portion 6, so that the center core 2 can be positioned. Due to this, the center core 2 can be always moved to a given position regardless of the diameters of the flanges.

Now, description will be given below in more detail of the above-mentioned center core 2 and moving and positioning device 1.

Figure 2:
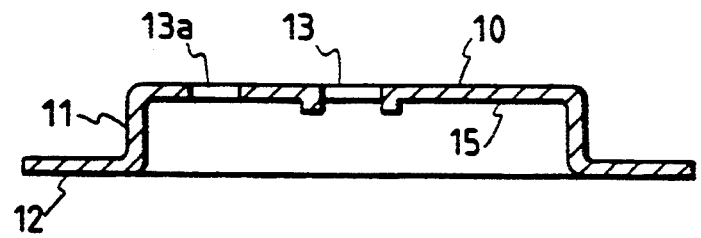
FIG. 2 is an enlarged section view of the center core shown in FIG. 1.

The center core 2, as shown in FIG. 2, is formed of a sheet of metal in an integral dish-like member which includes in the central portion thereof a circular projection portion 10 formed by drawing or the like with one side thereof projected in such a manner that the circular portion 10 is integrally connected through a stepped portion 11 to a flange portion 12. The circular projection portion 10 includes a central hole 13 in the center thereof and also an engaging hole 13a disposed adjacent to the central hole 13. A drive shaft provided in an apparatus (not shown) such as a recording and reproducing apparatus or the like can be engaged with the two holes 13 and 13a. The circular projection portion 10 provides the above-mentioned circular recess portion 15 on the back side thereof.

The center core 2 is designed such that the outside diameters of the central hole 13, engaging hole 13a, and circular projection portion 10, the height of the stepped portion 11, and the inside diameter of the circular recess portion 15 are all unified according to the size thereof. In other words, the center core 2 is formed on the basis of reference values so that it can conform to all of the specified magnetic disk devices.

The center core 2 is supplied from a part supply device to a delivery passage with the circular projection portion 10 facing upwardly, and to the delivery passage there is connected a shooter 3 which forms the delivery passage A of the moving and positioning device 1. The shooter 3, as shown in FIG. 1, is a delivery passage having a trough-like section, is slightly larger in width than the outside diameter of the flange portion 12 of the center core 2, and includes means (such as a vibration feeder, an air blower or the like) for advancing the center core 2 toward the stopper 5 in a direction of an arrow X shown in FIG. 1.

In a given position of the shooter 3, there is provided a stop pin 16 which can be contacted with the flange portion 12 of the center core 2 to stop the entry of the center core 2. The stop pin 16 is also arranged such that it is free to appear from or disappear into the upper surface of the shooter 3. Once the center core passes over the contracted stop pin 16, the stepped portion 11 of the stopper 5 contacts the center core 2 to hold the center core 2 provisionally before the center core 2 is fed out in a transverse direction (that is, in a direction of an arrow Y in FIG. 1). Here, the shooter 3 includes on the right and left sides thereof the above-mentioned guide portion 4 which extends over the flange portion 12. The guide portion 4 is a flat member which includes in the leading end thereof a contact surface 17 for contact with the stepped portion 11. Further, the guide portion 4 includes a lower surface in such a manner that the lower surface is not in touch with the flange portion 12. Thus, the flange portion 12 of the center core 2 can be guided without being in touch with the guide portion 4.

The stopper 5 is a flat member which can be said to have an inverted L shape. In particular, the stopper 5 includes, on the inner side of the end portion of the inverted L shape, a contact end face 18 for contact with the other surface of the stepped portion 11. The contact end face 18 and the contact surface 17 of the guide portion 4 cooperate in stopping the center core 2 at a given position. The stopper 5 is arranged such that it is free to move with respect to the shooter 3 with the guide portion 4 mounted thereto and also can be moved, for example, in the Xa direction by a cylinder device (not shown) or the like. Specifically, the stopper 5 is retracted to such a position that, when the center core 2 is moved, at least the circular projection portion 10 can never be in touch with the leading end of the contact end face 18.

The above-mentioned moving and positioning base member 7 is a member which is projected out perpendicularly and horizontally to the contact surface 17 of the guide portion 4. The moving and positioning base member 7 includes an upper surface which is level with the upper surface of the shooter 3 and the width of the moving and positioning base member 7 along the X direction is larger than the outside diameter of the flange portion 12 of the center core 2. Further, on the leading end portion of the moving and positioning member 7 existing in the moving direction (Y direction) of the center core 2, there is provided a circular projected portion 6 on which the circular recess portion 15 of the center core 2 is to be mounted.

The projected portion 6 includes an upper surface level with the upper surface of the moving and positioning base member 7 and also includes in the outer peripheral portion thereof a flange mounting groove 19 which is lower in level than the other portions of the projected portion 6 for holding the flange portion 12 of the center core 2. Also, in the flange mounting groove 19, there are formed a plurality of suction holes 19a in a manner to surround the projected portion 6. In such structure, air is sucked from the suction holes 19a to thereby attract and hold the flange portion 12, which is positioned so as to cover the suction holes 19a, so that the center core 2 can be positioned with more accuracy.

On a line connecting the center of the projected portion 6 of the moving and positioning base member 7 with the center of the central hole 13 of the center core 2 stopped by the stopper 5, there is formed a guide groove 8 for insertion of the center pin 9 which is to be inserted into the central hole 13. And, below the guide groove 8 and on the inner side of the moving and positioning base member 7, there is provided, for example, such a center pin moving device 20 as shown in FIG. 3.

The center pin moving device 20 includes a guide member 21 disposed below the guide groove 8 and extending along the guide groove 8, a bridge member 22 provided movably in the guide member 21, a cylinder 23 disposed in the bridge member 22 and facing upwardly, and a rod member facing upwardly from the cylinder 23. The rod member is used also for the center pin 9. In the bridge member 22, there is also provided a rod 24 for a second cylinder (not shown) and thus the bridge member 22 can be reciprocated in the Y direction on the guide member 21 by means of the second cylinder. Also, the center pin 9 is allowed to stand up or appear on the upper surface of the moving and positioning base member 6 from within the guide groove 8 by means of the expanding operation of the upwardly facing cylinder 23, whereas the center pin 9 can be stored into the guide groove 8 by means of the reversed operation of the cylinder 23. The center pin 9 is arranged such that it is always in engagement with the guide groove 8 and, therefore, then the bridge member 22 is moved in the Y direction, the engagement between the center pin 9 and the guide member 8 is used also as guide means for moving the bridge member 22.

In the moving device 1 structured in the above manner, when the center cores 2a, 2b, 2c, . . . lined up and stopped on the shooter 3 by the stop pin 16 shown in FIG. 1 are fed out one by one by means of removal of the stop pin 16, then the fed-out core center is stopped at a given position in such a manner that the stepped portion 11 is held by the contact surface 17 of the guide portion 4 and the contact end face 18 of the stopper 5.

Figure 3:
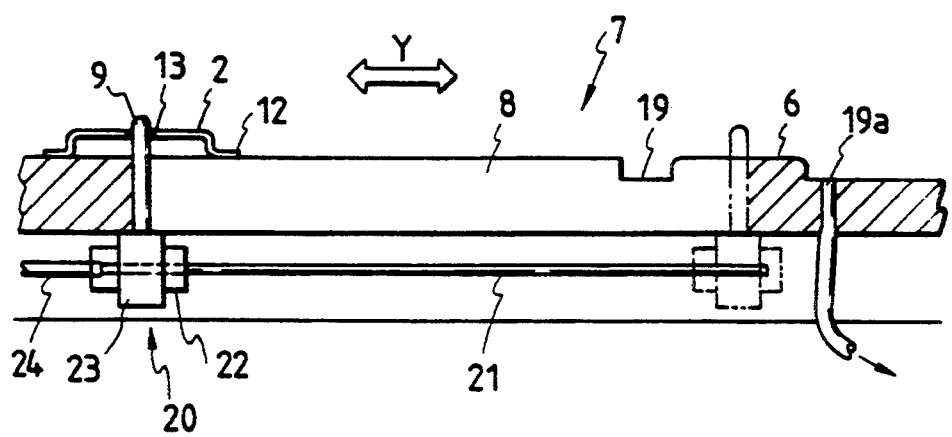
FIG. 3 is a schematic side view of the main portions of the moving and positioning device shown in FIG. 1.

Next, the upward facing cylinder 23 shown in FIG. 3 is energized upwardly to thereby allow the center pin 9 to be inserted into the central hole 13 of the center core 2. And, the center core is moved in a right direction from left in FIG. 3 by the rod 24 of the second cylinder (not shown). In this movement, the flange portion 12 of the center core 2 slides on the upper surface of the moving base member 7 and the center core 2 is mounted and positioned on the projected portion 6. Then, the flange portion 12 is fitted into the flange mounting groove 19 and is attracted downward by the suction holes 19a, so that the center core 2 mounted on the projected portion 6 can be secured in a stable condition. In this condition, if the cylinder 23 is again energized in the opposite direction to thereby remove the center pin 9 from the center core 2, then the rod 24 is returned to its original position, which completes one cycle for moving and positioning the center core.

After then, the center core 2 moved to and positioned on the projected portion 6 is delivered by a handling device or the like, which is provided separately but is not shown, to the next step of bonding the magnetic disk sheet. Accordingly, if the stop pin 16 on the shooter 3 is operated in accordance with the timing thereof for operation with the handling device, then the center core can be automatically moved and positioned without delay. Especially, in the moving and positioning device according to the present embodiment, the center core 2 is moved by the means to be fitted into the central hole 13 formed in the central portion of the center core 2 and the final positioning thereof is performed by the means, which can be fitted with the circular recess portion 15 and is independent of the kinds of the center cores. This makes it possible to position the center core 2 accurately regardless of variations in the outer dimension of the center core 2. Also, according to the present moving and positioning method and device, even when other kinds of center cores differing in the outside diameters of the flange portion 12 are manufactured in the same production line, there is eliminated the need to change or adjust the delivery line because of different outer dimensions of the center core flange portion.

The moving and positioning device of the invention is not limited to the above-mentioned embodiment but various changes and modifications are possible. For example, although in the above-mentioned embodiment the center pin moving device 20 uses the upward facing cylinder 23, the cylinder 23 can be replaced by a pantograph-like link device 25 as shown in FIG. 4.

In the structure shown in FIG. 4, in a link member 26 disposed on the pressure side of the rod 24, there is provided a securing portion 27 which can be engaged with the rod 24 and a link member 28 disposed below the rod 24 to thereby secure or stop the contracting movement of the link device 25 (that is, the upward and downward movements of the center pin 9), and the bridge member 22 disposed low is connected with the center pin 9 disposed high by means of four link members including the link member 26. And, if the link device 25 is pushed by the rod 24, then the center pin 9 is moved upwardly and, in a state in which the respective link members stand up, the securing portion 27 supports the link member 28. Then, if the link device 25 is further pushed by the rod 24, then the center pin 9 is moved through the bridge member 22 on the guide member 21 shown in FIG. 3. Next, if the rod 24 is pulled, then the securing portion 27 is disengaged and thus the center pin 9 is moved downward, so that the bridge member 22 is guided by the guide member 21 and is thus returned to its original position.

As has been described heretofore in detail, according to the magnetic disk center core moving and positioning method and device of the invention, a center core is moved by means which can be fitted into a central hole formed in the central portion of the center core and the final positioning of the center core is achieved by means which can be fitted with a circular recess portion not differing according to or independent of the kinds of the center cores. Due to this, the center cores can be moved and positioned accurately regardless of variations in the outer dimensions of the center cores. Also, even when other kinds of center cores differing in the outside diameters of the flange portions thereof are manufactured in the same production line, there is eliminated the need for change and adjustment of a delivery line owing to the different outer dimensions of the center cores and there is also eliminated the time for switching the production lines. That is, the present invention can realize a very efficient moving and positioning operation.

What is claimed is:

1. A center core moving and positioning method for feeding out one by one a plurality of center cores, each center core including in an outer periphery thereof a flange portion for bonding a magnetic disk sheet thereto, a circular projection portion disposed on one side thereof and inside the flange portion with a stepped portion therebetween and a central hole formed in the circular projection portion for engagement of a drive shaft, from a delivery passage for sequentially delivering and lining up the center cores, and positioning the center core at a given position, said method comprising the steps of: after said center core is stopped at a terminal end portion of said delivery passage, moving said center core on and along a moving and positioning base member by means of fitting means engageable with said central hole of said center core; and, fitting a circular recess portion of said center core with a projected portion provided on said moving and positioning base member, thereby positioning said center core.

2. A center core moving and positioning device comprising a delivery passage for sequentially delivering and lining up a plurality of center cores, each center core including in an outer periphery thereof a flange portion for bonding a magnetic disk sheet thereto, a circular projection portion disposed on one side thereof and inside the flange portion with a stepped portion therebetween and a central hole formed in the circular projection portion for engagement of a drive shaft, for moving the center cores one by one onto positioning means, said device comprising:

stopping means disposed at a terminal end portion of said delivery passage and contactable with said stepped portion of said center core to stop said center core; and said positioning means including a moving and positioning base member extending transversely to said delivery passage in correspondence to a stop position of said center core stopped by said stopping means, a center pin feedable into said central hole so as to move said center core on said moving and positioning base member, and a projected portion which can be fitted inside said stepped portion of said center core, wherein said stepped portion is moved onto said projected portion by said center pin.

3. A center core moving and positioning device as set forth in claim 2, wherein said moving and positioning base member includes a guide groove for permitting the movement of said center pin which is fitted into said center core from a bottom side thereof.

4. A center core moving and positioning device as set forth in claim 2 or 3, wherein in a peripheral portions of said projected portion there are formed a plurality of suction holes for attracting said flange portion of said center core.

* * * * *